United States Patent
Choi et al.

(10) Patent No.: US 10,989,801 B2
(45) Date of Patent: Apr. 27, 2021

(54) METHOD AND DEVICE FOR DETERMINING DISTANCE FROM OBJECT USING RADAR

(71) Applicant: Samsung Electronics Co., Ltd., Suwon-si (KR)

(72) Inventors: SungDo Choi, Suwon-si (KR); DongHan Kim, Osan-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 366 days.

(21) Appl. No.: 16/031,180

(22) Filed: Jul. 10, 2018

(65) Prior Publication Data

US 2019/0227155 A1 Jul. 25, 2019

(30) Foreign Application Priority Data

Jan. 22, 2018 (KR) .................. 10-2018-0007551

(51) Int. Cl.
*G01S 13/32* (2006.01)
*G01S 13/931* (2020.01)
(Continued)

(52) U.S. Cl.
CPC ............ *G01S 13/325* (2013.01); *G01S 7/023* (2013.01); *G01S 13/58* (2013.01); *G01S 13/584* (2013.01); *G01S 13/931* (2013.01)

(58) Field of Classification Search
CPC ...... G01S 13/325; G01S 13/58; G01S 13/584; G01S 13/931; G01S 7/023
(Continued)

(56) References Cited

U.S. PATENT DOCUMENTS 3,621,221 A 11/1971 Cann
5,754,584 A * 5/1998 Durrant .................. H04B 1/707
375/142

(Continued)

FOREIGN PATENT DOCUMENTS

JP 2010-261752 A 11/2010
JP 2011-69638 A 4/2011
(Continued)

OTHER PUBLICATIONS

Extended European Search Report dated Jun. 27, 2019 in counterpart European Patent Application No. 182062372 (8 pages in English).

*Primary Examiner* — Erin F Heard
*Assistant Examiner* — Michael W Justice
(74) *Attorney, Agent, or Firm* — NSIP Law

(57) ABSTRACT

A method of determining a distance from an object performed in an apparatus including a radar, the method including receiving a reflection signal produced by a transmission signal reflecting from the object, the transmission signal being modulated by a default code sequence; converting the reflection signal into a reflection code sequence; generating a subject correlation vector including at least one correlation between at least one assistance code sequence and the reflection code sequence; and determining a distance corresponding to the subject correlation vector by referencing a lookup table storing at least one reference correlation vector including at least one correlation between the at least one assistance code sequence and the default code sequence.

28 Claims, 14 Drawing Sheets

(51) Int. Cl.
*G01S 13/58* (2006.01)
*G01S 7/02* (2006.01)

(58) Field of Classification Search
USPC .......................................................... 342/109
See application file for complete search history.

(56) References Cited

U.S. PATENT DOCUMENTS

| | | | |
|---|---|---|---|
| 7,505,516 B2 * | 3/2009 | Gargin | ..................... H04B 1/69 |
| | | | 332/109 |
| 7,843,381 B2 | 11/2010 | Matsuoka | |
| 2003/0193430 A1 | 10/2003 | Gresham et al. | |
| 2005/0185697 A1 * | 8/2005 | Gargin | ..................... H04B 1/69 |
| | | | 375/130 |
| 2005/0275583 A1 * | 12/2005 | Mikami | ................. G01S 7/285 |
| | | | 342/109 |
| 2009/0103593 A1 * | 4/2009 | Bergamo | ................. H04J 13/00 |
| | | | 375/146 |
| 2012/0001791 A1 | 1/2012 | Wintermantel | |
| 2015/0061922 A1 | 3/2015 | Kishigami | |
| 2015/0084806 A1 | 3/2015 | Rohling | |
| 2015/0145714 A1 | 5/2015 | Watanabe et al. | |
| 2015/0331096 A1 | 11/2015 | Schoor et al. | |
| 2017/0336495 A1 * | 11/2017 | Davis | .................... G01S 13/931 |
| 2018/0031674 A1 * | 2/2018 | Bordes | ................. G01S 13/325 |
| 2019/0317207 A1 * | 10/2019 | Schroder | ............... G01S 13/878 |

FOREIGN PATENT DOCUMENTS

| | | |
|---|---|---|
| JP | 2014-202741 A | 10/2014 |
| JP | 5823062 B2 | 11/2015 |
| KR | 10-2015-0021604 A | 3/2015 |
| KR | 10-1705532 B1 | 3/2015 |

* cited by examiner

METHOD AND DEVICE FOR DETERMINING DISTANCE FROM OBJECT USING RADAR

CROSS-REFERENCE TO RELATED APPLICATIONS

This application claims the benefit under 35 USC 119(a) of Korean Patent Application No. 10-2018-0007551 filed on Jan. 22, 2018, in the Korean Intellectual Property Office, the entire disclosure of which is incorporated herein by reference for all purposes.

BACKGROUND

1. Field

The following description relates to a method and a device for determining a distance from an object using a radar.

2. Description of Related Art

Advanced driver-assistance systems (ADAS) are assistance systems to support driving for the purpose of avoiding dangerous situations and enhance safety and convenience of a driver using sensors located inside or outside a vehicle.

Sensors used in an ADAS include, for example, a camera, an infrared sensor, an ultrasonic sensor, a lidar, and a radar. The radar is capable of stably measuring an object in a vicinity of a vehicle regardless of a surrounding environment such as the weather, in comparison to an optical-based sensor such as the infrared sensor or the lidar.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method of determining a distance from an object performed in an apparatus including a radar includes receiving a reflection signal produced by a transmission signal reflecting from the object, the transmission signal being modulated by a default code sequence; converting the reflection signal into a reflection code sequence; generating a subject correlation vector including at least one correlation between at least one assistance code sequence and the reflection code sequence; and determining a distance corresponding to the subject correlation vector by referencing a lookup table storing at least one reference correlation vector including at least one correlation between the at least one assistance code sequence and the default code sequence.

The transmission signal may be a phase-modulated continuous waveform (PMCW) signal.

The converting of the reflection signal into the reflection code sequence may include generating a cumulative code sequence including a preset number of codes by accumulating a portion of the reflection code sequence.

The preset number of codes included in the cumulative code sequence may be equal to a number of codes included in the default code sequence.

The cumulative code sequence may include a latest code in the reflection code sequence.

The generating of the cumulative code sequence may include loading the cumulative code sequence from a target accumulator configured to store the preset number of codes among a plurality of accumulators having different accumulation time points.

The generating of the cumulative code sequence may include loading the cumulative code sequence from a queue configured to store the preset number of codes on a first-in, first-out basis.

The lookup table may store a plurality of reference correlation vectors and a plurality of time indices respectively mapped to the plurality of reference correlation vectors, and the determining of the distance corresponding to the subject correlation vector may include determining a target reference correlation vector corresponding to the subject correlation vector from the plurality of reference correlation vectors in the lookup table; determining a reception time point of the reflection signal based on the time index mapped to the target reference correlation vector; and determining the distance from the object based on a time difference between a transmission time point of the transmission signal and the reception time point of the reflection signal.

The converting of the reflection signal into the reflection code sequence may include generating a cumulative code sequence including a preset number of codes by accumulating a portion of the reflection code sequence, the at least one correlation of the subject correlation vector may include at least one correlation between the at least one assistance code sequence and the cumulative code sequence, and the determining of the reception time point of the reflection signal may include determining the reception time point based on a point in time indicated by the time index mapped to the target reference correlation vector and an accumulation time point of the cumulative code sequence.

The time index may represent a pattern difference between the cumulative code sequence and the default code sequence by a number.

The accumulation time point of the cumulative code sequence may be acquired from a system clock of the apparatus including the radar.

The method may further include calculating a speed of the object based on the determined distance corresponding to the subject correlation vector and a previously determined distance corresponding to a previous subject correlation vector, and the reflection code sequence may include t codes, t being greater than a number of codes in the default code sequence, the determined distance may be a distance determined at a point in time at which a t-th code of the reflection code sequence is converted from the reflection signal, and the previously determined distance may be a distance determined at a point in time at which a (t−1)-th code of the reflection code sequence is converted from the reflection signal.

The radar may be included in a vehicle.

The vehicle may be an autonomous vehicle.

A number of the at least one assistance code sequence may be greater than or equal to two.

A number of the at least one assistance code sequence may be equal to one.

The lookup table may store a plurality of reference correlation vectors respectively corresponding to a plurality of different reception time points of a reflection signal, and including at least one correlation between the at least one assistance code sequence and reflection code sequences corresponding to reflection signals produced by the transmission signal modulated by the default code sequence reflecting from virtual objects located at different distances respectively corresponding to the different reception time points of the reflection signal.

In another general aspect, a non-transitory computer-readable medium stores instructions that, when executed by a processor, cause the processor to perform the method described above.

In another general aspect, a device for determining a distance from an object in an apparatus including a radar includes a processor; and a memory configured to store at least one instruction that is executable by the processor; wherein the processor executing the at least one instruction configures the processor to receive a reflection signal produced by a transmission signal reflecting from the object, the transmission signal being modulated by a default code sequence; convert the reflection signal into a reflection code sequence; generate a subject correlation vector including at least one correlation between at least one assistance code sequence and the reflection code sequence; and determine a distance corresponding to the subject correlation vector by referencing a lookup table storing at least one reference correlation vector including at least one correlation between the at least one assistance code sequence and the default code sequence.

The processor executing the at least one instruction may further configure the processor to generate a cumulative code sequence including a preset number of codes by accumulating a portion of the reflection code sequence.

The lookup table may store a plurality of reference correlation vectors and a plurality of time indices respectively mapped to the plurality of reference correlation vectors, and the processor executing the at least one instruction may further configure the processor to determine a target reference correlation vector corresponding to the subject correlation vector from the plurality of reference correlation vectors in the lookup table; determine a reception time point of the reflection signal based on the time index mapped to the target reference correlation vector; and determine the distance from the object based on a time difference between a transmission time point of the transmission signal and the reception time point of the reflection signal.

A number of the at least one assistance code sequence may be greater than or equal to two.

A number of the at least one assistance code sequence may be equal to one.

The lookup table may store a plurality of reference correlation vectors respectively corresponding to a plurality of different reception time points of a reflection signal, and including at least one correlation between the at least one assistance code sequence and reflection code sequences corresponding to reflection signals produced by the transmission signal modulated by the default code sequence reflecting from virtual objects located at different distances respectively corresponding to the different reception time points of the reflection signal.

In another general aspect, a method of determining a distance from an object performed in an apparatus including a radar includes receiving a reflection signal produced by a transmitting signal reflecting from the object, the transmitting signal being modulated by a default code sequence; converting the reflection signal into a reflection code sequence; and determining the distance from the object based on a comparison between a first value determined based on an assistance code sequence and the reflection code sequence, and a plurality of second values already determined before the reflection signal was received based on the assistance code sequence and the default code sequence.

The first value may be a value of a correlation between the assistance code sequence and a portion of the reflection code sequence, and each of the second values may be a correlation between the assistance code sequence and a delayed default code sequence obtained by delaying the default code sequence by a different amount for each of the second values.

The default code sequence and the portion of the reflection code sequence may each have a length of m codes, and the second values may be m second values determined based on m delayed default code sequences obtained by delaying the default code sequence by amounts corresponding to 0 to m−1 codes.

A first delayed default code sequence of the m delayed default code sequences may be the default code sequence, and each succeeding one of the m delayed default code sequences may be obtained by moving a first code of an immediately preceding one of the m delayed default code sequences to an end of the immediately preceding one of the m delayed default code sequences.

The second values and a plurality of time indices respectively mapped to the second values may be stored in a lookup table, and the determining of the distance from the object may include retrieving from the lookup table the time index mapped to one of the second values that is most similar to the first value; and determining the distance from the object based on the retrieved time index.

The first value may be determined based on the assistance code sequence and a portion of the reflection code sequence, each of the second values may be determined based on the assistance code sequence and a delayed default code sequence obtained by delaying the default code sequence by a different amount for each of the second values, each of the time indices may represent an amount of time by which the default code sequence was delayed to obtain the delayed default code sequence used in determining a corresponding one of the second values, the retrieved time index may represent a reception latency between a reception time point of the reception signal and a reception time point of a beginning of the portion of the reflection code sequence used in determining the first value, and the determining of the distance from the object based on the retrieved time index may include determining a time difference between the reception latency and a transmission latency between a transmission time of the transmission signal and the reception time point of the beginning of the reflection code sequence, and determining the distance from the object based on the time difference.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Figure 1:
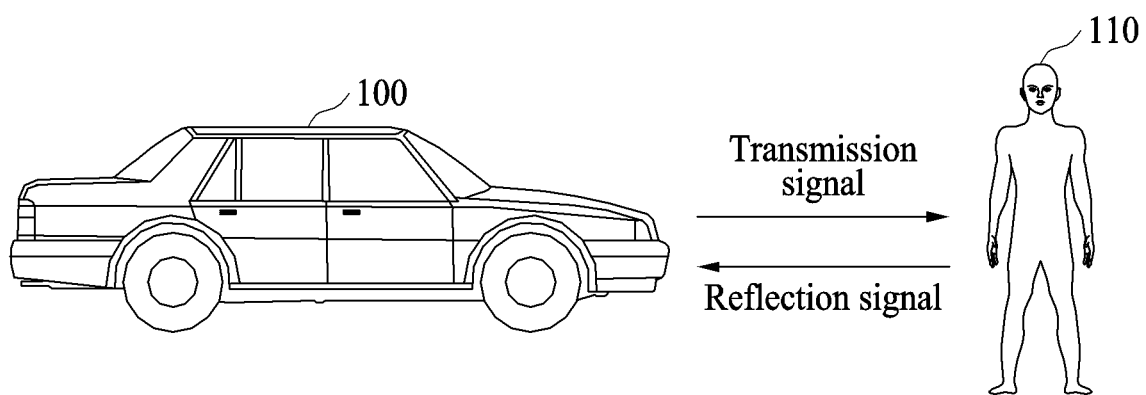
FIG. 1 illustrates an example of a method of detecting an object using a radar in a vehicle.

FIG. 1 illustrates an example of a method of detecting an object using a radar in a vehicle.

Referring to FIG. 1, one example of a method of detecting an object 110 in a vicinity of a vehicle 100 is a method of transmitting a signal away from the vehicle 100 and detecting a signal reflected by the object 110. For example, a radar of the vehicle 100 transmits a transmission signal for detection of an object away from the vehicle 100, receives a reflection signal reflected by the object 110, calculates a time of flight (ToF) based on the transmission signal and the reflection signal, and calculates a distance between the vehicle 100 and the object 110 based on the ToF.

To distinguish the reflection signal reflected by the object 110 from other signals such as noise and interference signals, the radar uses a signal modulated by a predetermined code as a transmission signal. When a reception signal received by the radar corresponds to the transmission signal, a device for determining a distance from an object processes the reception signal as a reflection signal. When the reception signal does not correspond to the transmission signal, the device processes the reception signal as a noise signal or an interference signal. Hereinafter, the term "device for determining a distance from an object" is also referred to as "object distance determining device."

The transmission signal is, for example, a continuously transmitted signal. In one example, the transmission signal is a frequency-modulated continuous wave (FMCW) signal. The FMCW signal is obtained by frequency modulating a carrier signal having a frequency of, for example, 77 gigahertz (GHz). A millimeter wave in a band of 77 GHz is a signal having many cycles in a predetermined time, and thus provides a relatively high distance resolution when used as a radar signal.

In another example, the transmission signal is a phase-modulated continuous wave (PMCW) signal. The PMCW signal is obtained by phase modulating a carrier signal having a frequency of, for example, 77 GHz. To generate a PMCW signal, the carrier signal is modulated by a code sequence. The code sequence includes a plurality of consecutive codes, for example, binary codes such as codes representing "0" and "1."

Figure 2:
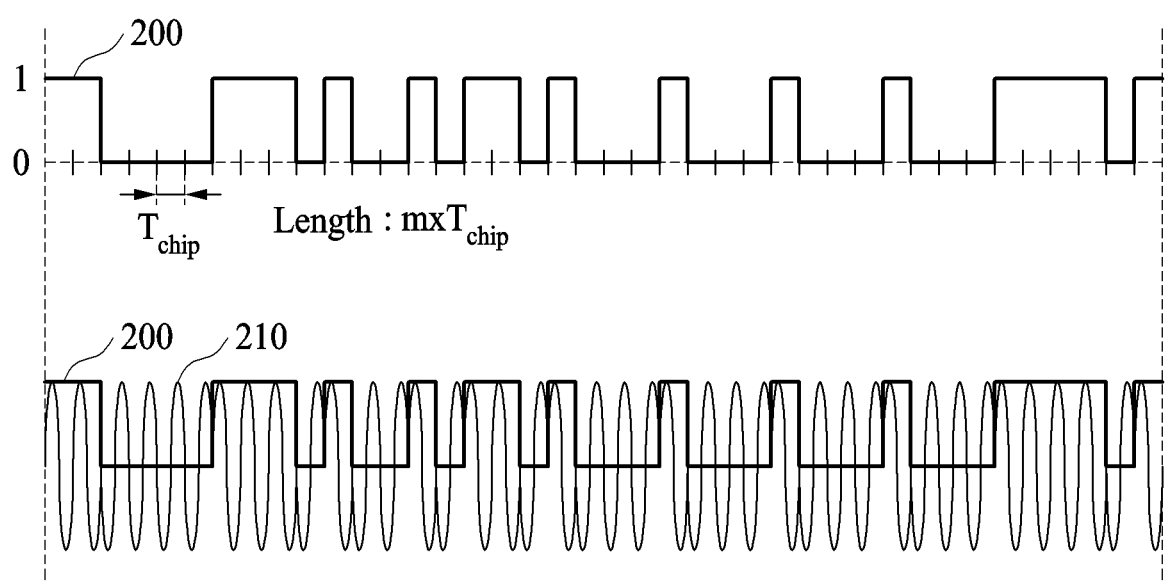
FIG. 2 illustrates an example of a default code sequence and a transmission signal.

FIG. 2 illustrates an example of a default code sequence and a transmission signal.

Referring to FIG. 2, a horizontal axis is a time axis. A default code sequence 200 is a digital signal including a plurality of consecutive codes. The default code sequence 200 is generated using at least two codes. The at least two codes include a code representing "low value" and a code representing "high value", for example, a code representing "0" and a code representing "1." The default code sequence 200 does not need to have good autocorrelation and cross-correlation properties, and may be predetermined and assigned to a radar.

A single code corresponds to a single chip duration $T_{chip}$, and the default code sequence 200 includes m codes. A length of the default code sequence 200 including the m codes (a total chip length) is $m \times T_{chip}$, m being, for example, 256.

A transmission signal 210 is generated based on the default code sequence 200. The transmission signal 210 is a PMCW signal. FIG. 2 illustrates an example of the transmission signal 210 generated as a continuous waveform corresponding to the default code sequence 200. For example, a code representing "high value" or "1" in the default code sequence 200 is represented by a sine wave having a first phase in the transmission signal 210, and a code representing "low value" or "0" in the default code sequence 200 is represented by a sine wave having a second phase 180 degrees out of phase with the first phase in the transmission signal 210. That is, the phase of the sine wave is inverted each time a code changes from "0" to "1" or from "1" to "0." The transmission signal 210 is transmitted away from a vehicle using a transmitter of the radar.

Figure 3:
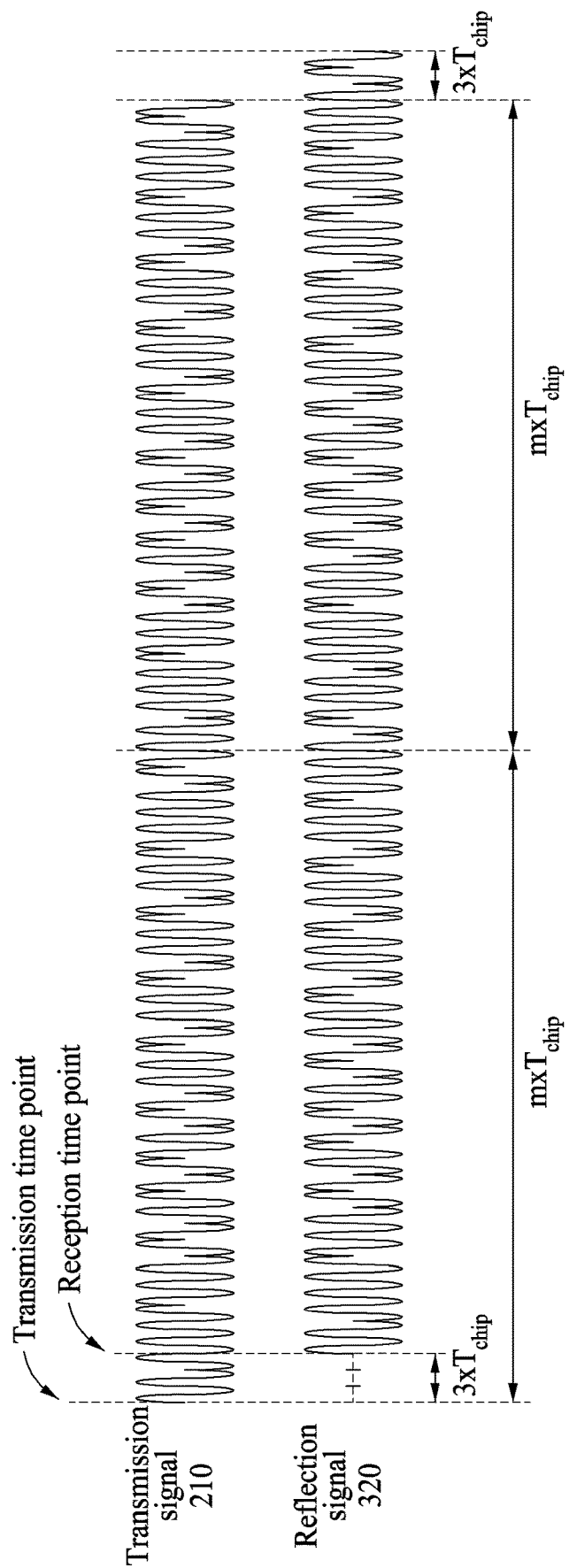
FIG. 3 illustrates an example of a transmission signal and a reflection signal.

FIG. 3 illustrates an example of a transmission signal and a reflection signal.

Referring to FIG. 3, when an object is in a vicinity of a radar, the radar receives a reflection signal 320 after a certain time has elapsed from a point in time at which the transmission signal 210 was transmitted. FIG. 3 illustrates an example in which a reception of the reflection signal 320 starts after a time of $3 \times T_{chip}$ has elapsed from a transmission time point of the transmission signal 210. A reception time point of the reflection signal 320 varies based on a distance from the object. When the distance from the object increases, a time difference between the transmission time point and the reception time point of the reflection signal 320 also increases. Conversely, when the distance from the object decreases, a time difference between the transmission time point and the reception time point of the reflection signal 320 also decreases. The time difference between the transmission time point and the reception time point of the reflection signal 320 is a ToF of the transmission signal 210.

When the transmission signal 210 is repetitively and continuously transmitted, the reflection signal 320 is also received repetitively and continuously. Although FIG. 3 illustrates that no reflection signal is received during a time period of $3 \times T_{chip}$ at the beginning of the reflection signal 320, a reflection signal corresponding to a last $3 \times T_{chip}$ time period of a reflection signal received in a previous time period of $m \times T_{chip}$ is actually received during the time period of $3 \times T_{chip}$ in FIG. 3 when the transmission signal 210 is transmitted repetitively.

The reception time point of the reflection signal 320 may be obtained using various methods.

One method of obtaining the reception time point of the reflection signal 320 is a 1:1 comparison-based method. In this method, a reception time point is determined by performing a 1:1 comparison between a default code sequence and a cumulative code sequence. The cumulative code sequence is obtained by converting a cumulative signal in which a portion of a reflection signal is accumulated into a digital signal. A plurality of cumulative code sequences are acquired while sliding along a time axis. An accumulation time point of each of the cumulative code sequences is acquired from a system clock of an object distance determining device. Among the cumulative code sequences, a cumulative code sequence matching a pattern of the default code sequence is determined, so that a reception time point is determined based on an accumulation time point of the determined cumulative code sequence. When a number of chips of the cumulative code sequence is m, the cumulative code sequence slides m times by an amount corresponding to one chip duration along the time axis, resulting in a total slide length of m chip durations, and a correlation between the default code sequence and the cumulative code sequence sliding along the time axis is calculated each of the m times the cumulative code sequence slides along the time axis. Among the calculated m correlations, a movement value on the time axis having a highest correlation is determined to be a ToF. In this method, the sliding along the time axis and the calculating of the correlation is performed m times, and thus an amount of calculations is relatively large.

Another method of obtaining the reception time point of the reflection signal 320 is a lookup table referencing method. In this method, a subject correlation vector representing a correlation between a cumulative code sequence for a current chip duration and an assistance code sequence included in a predetermined encoding sequence set is calculated. By referencing a lookup table storing previously calculated reference correlation vectors representing correlations between a default code sequence and the assistance code sequence, and a time index corresponding to each reference correlation vector, a reference correlation vector corresponding to the subject correlation vector is retrieved from the reference correlation vectors stored in the lookup table. A time difference between a transmission time point and a reception time point is acquired based on a time index corresponding to the retrieved reference correlation vector. The encoding sequence set includes at least one assistance code sequence. A number of correlations included in a correlation vector is equal to a number of assistance code sequences. For example, when the encoding sequence set includes a plurality of assistance code sequences, for example, six assistance code sequences, the correlation vector includes the same number of correlations, for example, six correlations. When the encoding sequence set includes a single assistance code sequence, the correlation vector includes a single correlation. Thus, when using the lookup table referencing method, a number of the correlations that are calculated is equal to the number of assistance code sequences included in the encoding sequence set, and thus an amount of calculations is reduced in comparison to the 1:1 comparison-based method in which m correlations are calculated.

A method and device for determining a reception time point of the reflection signal 320 based on a lookup table referencing method and determining a distance from an object based on the determined reception time point will be described below.

Figure 4:
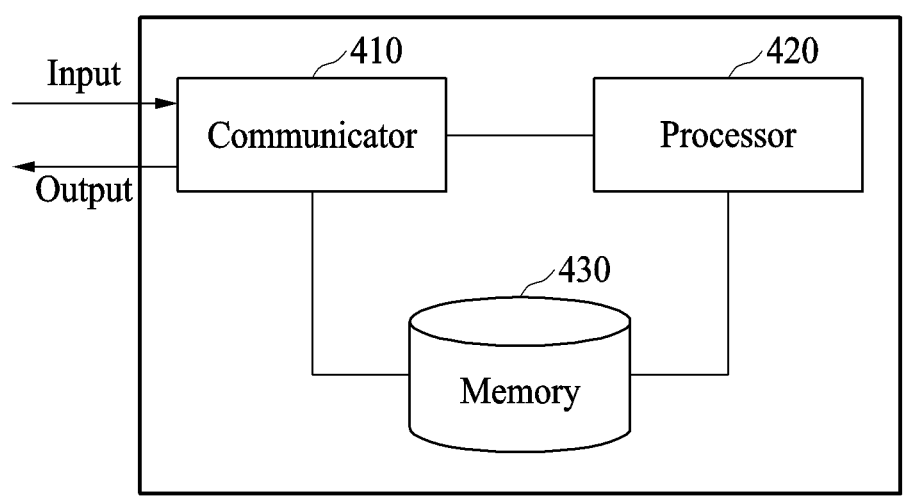
FIG. 4 illustrates an example of an object distance determining device.

FIG. 4 illustrates an example of an object distance determining device.

Referring to FIG. 4, an object distance determining device 400 includes a communicator 410, a processor 420, and a memory 430. The object distance determining device 400 is included in the vehicle 100 of FIG. 1. In one example, the object distance determining device 400 is an electronic control unit (ECU) of the vehicle 100 or is connected to the ECU of the vehicle 100, but is not limited thereto. A radar (not shown) is included in the vehicle 100 and is electrically connected to the object distance determining device 400.

The communicator 410 is implemented as, for example, circuitry in the object distance determining device 400. The communicator 410 includes an internal bus and an external bus, and further includes an interface configured to connect the object distance determining device 400 to one or more external devices. The communicator 410 receives data from the one or more external devices, and transmits data to the processor 420 and the memory 430.

The processor 420 processes data received by the communicator 410 and data stored in the memory 430. The term "processor," as used herein, is a hardware-implemented data processing device having a circuit that is physically structured to execute desired operations. In one example, the desired operations include code or instructions included in a program. Examples of the hardware-implemented data processing device include a microprocessor, a central processing unit (CPU), a processor core, a multi-core processor, a multiprocessor, an application-specific integrated circuit (ASIC), and a field-programmable gate array (FPGA), but the hardware-implemented data processing device is not limited thereto. The processor 420 executes computer-readable code (for example, software) stored in a memory (for example, the memory 430) that cause the processor 420 to execute the desired operations.

The memory 430 stores data received by the communicator 410 and data processed by the processor 420. In addition, the memory 430 stores software. The stored software is coded to determine a distance from an object, and includes instructions that are executable by the processor 420. The memory 430 includes, for example, any one or any combination of any two or more of a volatile memory, a nonvolatile memory, a random access memory (RAM), a flash memory, a hard disk drive, and an optical disc drive.

Figure 5:
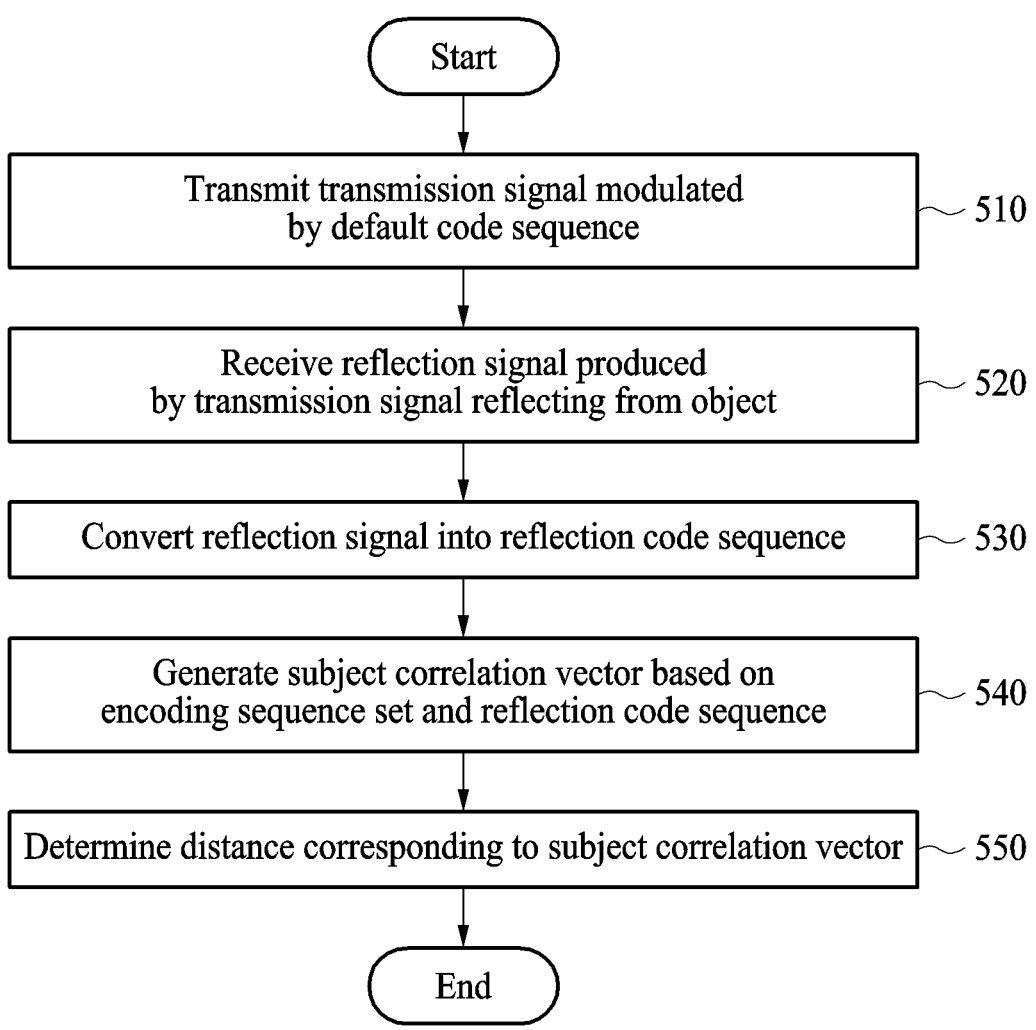
FIG. 5 illustrates an example of a method of determining a distance from an object.

FIG. 5 illustrates an example of a method of determining a distance from an object.

Referring to FIG. 5, operations 510 through 550 are performed by the object distance determining device 400 of FIG. 4

In operation 510, the object distance determining device 400 transmits a transmission signal modulated by a default code sequence away from a vehicle. For example, the object distance determining device 400 generates the transmission signal based on the default code sequence and transmits the transmission signal away from the vehicle using a transmitter. The default code sequence is, for example, a digital signal including a plurality of consecutive codes, where a number of the codes is determined in advance.

The object distance determining device 400 generates a transmission signal modulated by a default code sequence. The transmission signal is, for example, a PMCW signal generated based on the default code sequence.

In operation 520, the object distance determining device 400 receives a reflection signal produced by the transmission signal reflecting from an object. Thus, the reflection signal corresponds to the transmission signal. The reflection signal is received by a radar receiver.

In operation 530, the object distance determining device 400 performs analog-to-digital (ND) conversion on the reflection signal to convert the reflection signal into a digital signal that is a reflection code sequence. The reflection code sequence is a code sequence in which codes representing "0" and "1" are arranged chronologically.

Since each code in the reflection code sequence represents "0" or "1", it is difficult to determine whether a received signal received in the radar receiver is (1) the reflection signal generated by the transmission signal reflecting from the object, (2) an interference signal generated by another radar, or (3) noise based on a cumulative code sequence in which only a few codes have been accumulated. Thus, the cumulative code sequence has a sufficient length, for example, a length of a default code sequence (i.e., a length corresponding to a total of the chip durations of the default code sequence) to enable the object distance determining device to determine whether the received signal is the reflection signal generated by the transmission signal reflecting from the object. When the length of the cumulative code sequence is the length corresponding to the total of the chip durations of the default code sequence, the object distance determining device 400 is able to determine a distance from an object located within a maximum detectable distance. A number of codes included in the cumulative code sequence is equal to a number of codes included in the default code sequence.

In one example, the cumulative code sequence is generated using, for example, a plurality of accumulators. The plurality of accumulators accumulate reflection codes for a predetermined period (for example, the total of the chip durations "m×$T_{chip}$" of the default code sequence). In another example, the object distance determining device 400 stores a preset number of reflection codes, for example, m reflection codes, and updates a cumulative code sequence that ends with a reflection code corresponding to a current chip duration. For example, the cumulative code is updated on a first-in, first-out (FIFO) basis by storing a preset number of reflection codes in a queue, discarding an oldest accumulated reflection code among the reflection codes stored in the queue, and storing a new reflection code corresponding to a current chip duration in the queue. A method of generating the cumulative code sequence will be further described with reference to FIGS. 7 and 8.

In operation 540, the object distance determining device 400 generates a subject correlation vector based on an encoding sequence set and the reflection code sequence. In one example, a cumulative code sequence generated by accumulating codes of the reflection code sequence for a predetermined period of time is used to generate the subject correlation vector.

The encoding sequence set includes at least one assistance code sequence. A number of assistance code sequences included in the encoding sequence set is determined based on the number of chips of the default code sequence. The number of assistance code sequences is calculated according to Equation 1 below.

$$N \leq \log_2 m \quad (1)$$

In Equation 1, N denotes the number of assistance code sequences included in the encoding sequence set, and is greater than or equal to 1, and m denotes the number of chips of the default code sequence. For example, when the number of chips of the default code sequence is 256, the number of assistance code sequences included in the encoding sequence set is determined to be from 1 to 8.

A correlation between the cumulative code sequence and each of the assistance code sequences in the encoding sequence set is calculated. The subject correlation vector is generated by setting the calculated correlations as elements of the subject correlation vector. A number of the correlations is equal to the number of the assistance code sequences. A method of generating the encoding sequence set and the subject correlation vector will be further described with reference to FIGS. 9 through 11.

In operation 550, the object distance determining device 400 determines a distance corresponding to the subject correlation vector generated in operation 540. A distance corresponding to the subject correlation vector is determined to be a distance from an object. For example, a reference correlation vector most similar to the generated subject correlation vector is retrieved from a lookup table. In this example, a ToF of the transmission signal is calculated based on a time index corresponding to the retrieved reference correlation vector. The distance corresponding to the subject correlation vector used to determine the distance from the object is calculated based on the ToF of the transmission signal. A method of calculating the distance from the object will be further described with reference to FIG. 12.

Figure 6:
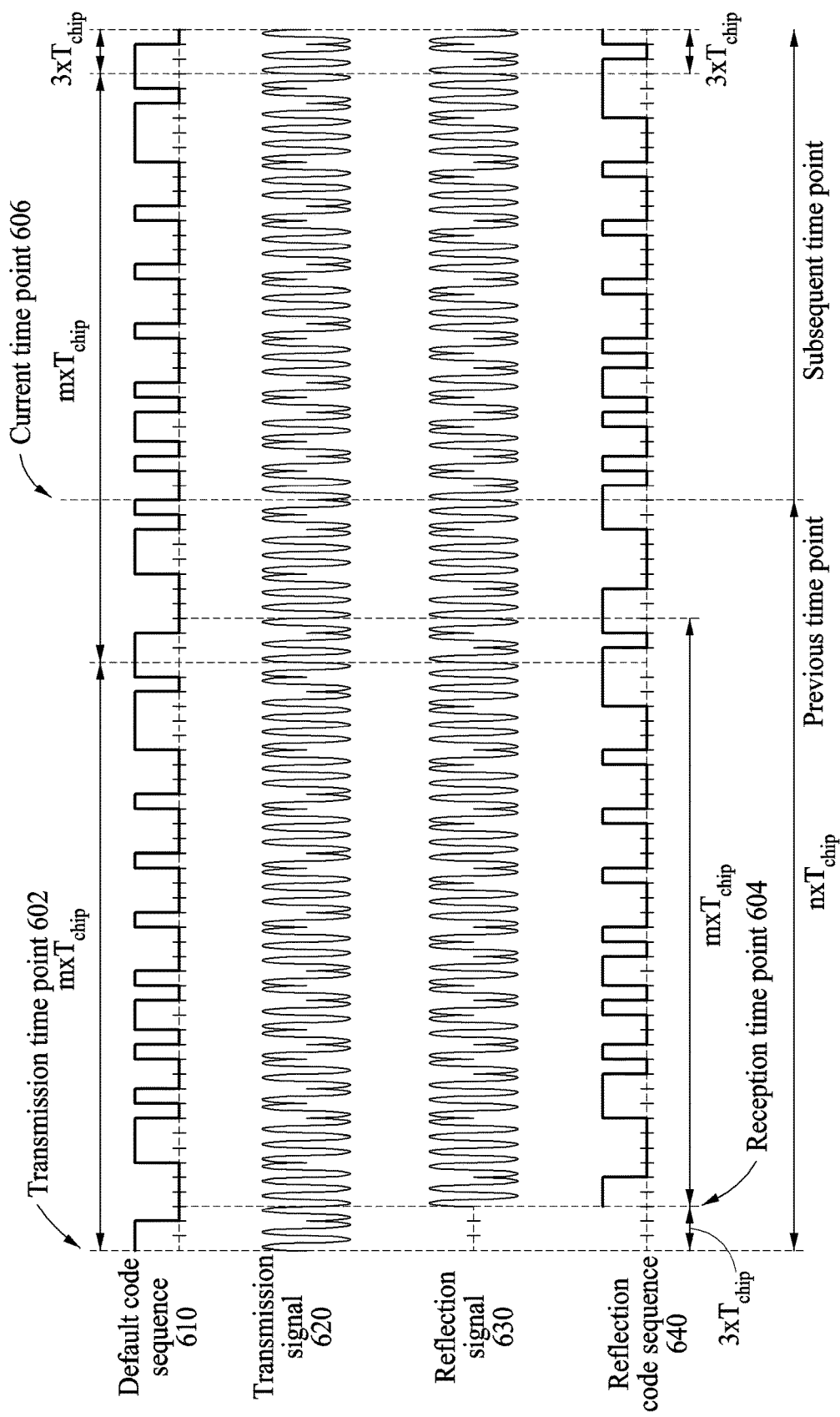
FIG. 6 illustrates an example of a default code sequence, a transmission signal, a reflection signal, and a reflection code sequence.

FIG. 6 illustrates an example of a default code sequence, a transmission signal, a reflection signal, and a reflection code sequence.

FIG. 6 illustrates a total period ((2m+3)×$T_{chip}$) as an example, and merely represents data processed in that period. However, at a point in time at which this example is actually performed, that is, at a current time point 606 at which a time of n×$T_{chip}$ has elapsed from a transmission time point 602, only a reflection code sequence 640 including n codes has been acquired, and a reflection code sequence after the time of $n \times T_{chip}$ has not yet been acquired.

A default code sequence 610 includes m codes. A transmission signal 620 is a PMCW signal modulated by the default code sequence 610. A radar transmits the transmission signal 620 at the transmission time point 602. The transmission signal 620 is reflected from an object, producing a reflection signal 630 that is received by the radar.

A point in time at which a reception of the reflection signal 630 starts, for example, a reception time point 604, varies based on a distance between a vehicle and an object. When the object is located close to the radar, the reception time point 604 is close to the transmission time point 602, and when the object is located far from the radar, the reception time point 604 is far from the transmission time point 602. In this example, the reception time point 604 of the reflection signal 630 reflected from an object located at a maximum detectable distance $((m \times T_{chip} \times c)/2$, where c denotes the speed of light) from the radar will differ from the transmission time point 602 by a time of $m \times T_{chip}$.

In the example illustrated in FIG. 6, the reception time point 604 differs from the transmission time point 602 by a time of $3 \times T_{chip}$. The object distance determining device 400 performs an ND conversion on a continuous waveform signal of the reflection signal 630 received from the transmission time point 602 for each chip duration to obtain the reflection code sequence 640. As a chip duration elapses, a length of the reflection code sequence 640 increases by the chip duration. Although FIG. 6 illustrates that no reflection signal is received during a time period of $3 \times T_{chip}$ at the beginning of the reflection signal 630, a reflection signal corresponding to a last $3 \times T_{chip}$ time period of a reflection signal received in a previous time period of $m \times T_{chip}$ is actually received during the time period of $3 \times T_{chip}$ in FIG. 6 when the transmission signal 620 is transmitted repetitively.

Although the continuous waveform signal of the reflection signal 630 is received for each chip duration, based on only a continuous waveform signal received in a single chip duration, it is not possible to determine which portion of the transmission signal 620 the continuous waveform signal received in the single chip duration corresponds to. Thus, at a time at which a continuous waveform signal is received, an amount of time from the transmission time point 602 to the reception time point 604 of the reflection signal 630 cannot be determined based only on the continuous waveform signal received in the single duration. A method of determining a distance between a vehicle and an object by accumulating a portion of the received reflection signal and determining a portion of the transmission signal 620 to which the accumulated portion of the reflection signal corresponds will be described below.

A method of determining a distance from an object based on a cumulative reflection signal will be further described with reference to FIGS. 7 through 12.

Figure 7:
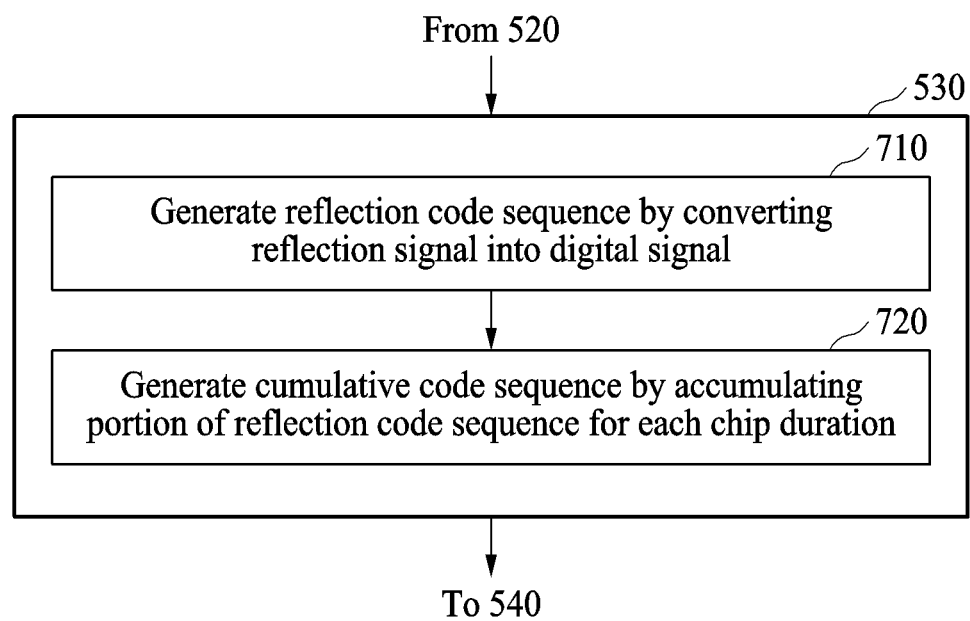
FIG. 7 illustrates an example of a method of generating a cumulative code sequence for each chip duration.

FIG. 7 illustrates an example of a method of generating a cumulative code sequence for each chip duration.

Referring to FIG. 7, operation 530 of FIG. 5 includes operations 710 and 720 described below.

In operation 710, the object distance determining device 400 generates the reflection code sequence 640 by performing an ND conversion on a received reflection signal, for example, the reflection signal 630. The reflection signal 630 is a continuous waveform signal and the reflection code sequence 640 is a digital signal.

In operation 720, the object distance determining device 400 generates a cumulative code sequence including a preset number of codes by accumulating a portion of the reflection code sequence 640. The object distance determining device 400 accumulates a portion of the reflection code sequence 640 for each chip duration using an accumulator. For example, the accumulator generates a cumulative code sequence by accumulating reflection codes for a time of $m \times T_{chip}$ before a predetermined time point. The time point is, for example, a point in time at which a time of $n \times T_{chip}$ has elapsed from the transmission time point 602 of the transmission signal 620, n being a non-negative integer. The cumulative code sequence includes a latest code generated in the reflection code sequence 640.

In one example, the cumulative code sequence is loaded from a target accumulator storing a preset number of codes among a plurality of accumulators having different accumulation time points. In another example, the cumulative code sequence is loaded from a queue storing a preset number of codes on a first-in, first-out basis.

Figure 8:
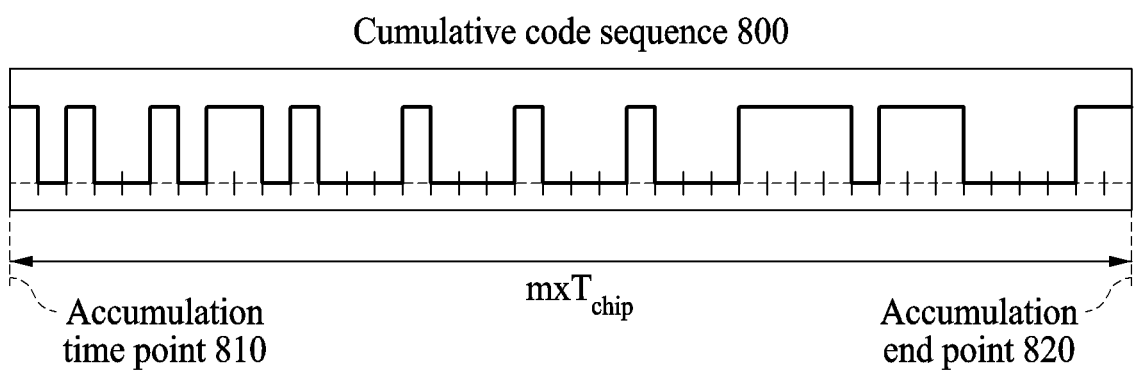
FIG. 8 illustrates an example of a cumulative code sequence.

FIG. 8 illustrates an example of a cumulative code sequence.

Referring to FIG. 8, a cumulative code sequence 800 is generated by accumulating m reflection codes for a time from an accumulation time point 810 to an accumulation end point 820.

The accumulation end point 820 is, for example, a point in time at which a time of $n \times T_{chip}$ has elapsed from the transmission time point 602, n being a non-negative integer.

The reception time point 604 of the reflection signal 630 is determined based on a position of the cumulative code sequence 800 relative to the default code sequence 610. The accumulation time point 810 of the cumulative code sequence 800 is acquired from a system clock of the object distance determining device 400. The accumulation time point 810 corresponds to a time difference from the transmission time point 602 of the transmission signal 620, and the time difference is referred to as a transmission latency. Also, the reception time point 604 of the reflection signal 630 is determined based on a code of the default code sequence 610 corresponding to a first code of the cumulative code sequence 800, that is, a first code received after the accumulation time point 810. When the accumulation time point 810 is $11 \times T_{chip}$ and a first code of cumulative code sequence 800 corresponds to a ninth code of the default code sequence 610, this means that first to eighth codes of the default code sequence 610 were received during a time of $8 \times T_{chip}$ between the reception time point 604 of the reflection signal 630 and the accumulation time point 810. Thus, when the accumulation time point 810 is $11 \times T_{chip}$ from the transmission time point 602 of the transmission signal 620, the object distance determining device 400 calculates that a first code of the reflection code sequence 640 was received at a point in time at which a time of $(11-8) \times T_{chip} = 3 \times T_{chip}$ has elapsed from the transmission time point 602 of the transmission signal 620.

Examples of determining the reception time point 604 using the cumulative code sequence 800 will be described with reference to FIG. 9.

Figure 9:
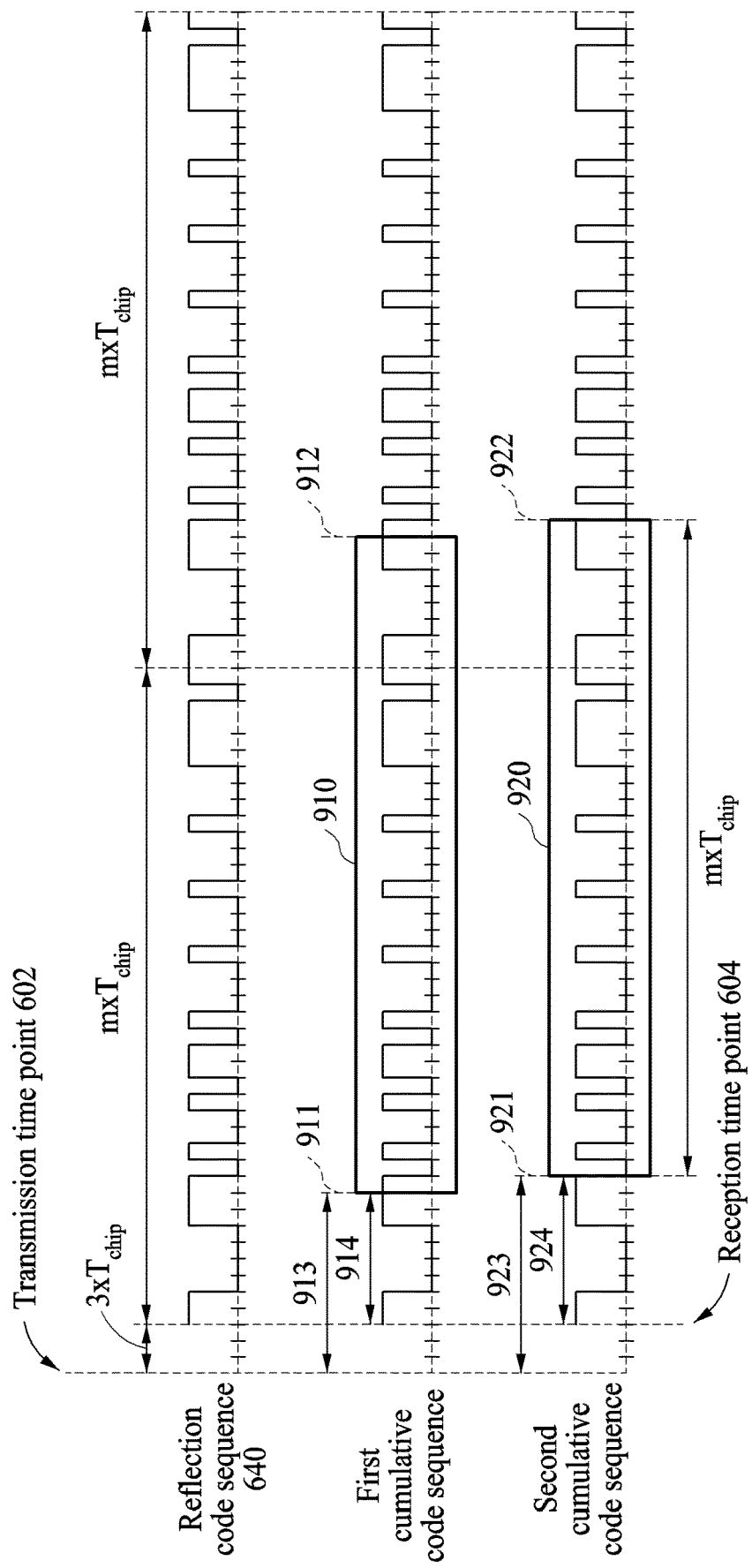
FIG. 9 illustrates an example of a method of determining a reception time point of a reflection signal using a cumulative code sequence.

FIG. 9 illustrates an example of a method of determining a reception time point of a reflection signal using a cumulative code sequence.

Referring to FIG. 9, the object distance determining device 400 generates a reflection code sequence 640 by performing an ND conversion on the reflection signal 630 received for each chip duration.

The object distance determining device 400 generates a plurality of cumulative code sequences including a first cumulative code sequence 910 and a second cumulative code sequence 920 by accumulating a preset number of reflection codes in the reflection code sequence 640 generated for each chip duration using an accumulator. The first cumulative code sequence 910 is a cumulative code sequence generated by accumulating reflection codes for a time of $m \times T_{chip}$ from a first time point 911 to a second time point 912. The second cumulative code sequence 920 is a cumulative code sequence generated by accumulating reflection codes for the time of $m \times T_{chip}$ from a third time point 921 to a fourth time point 922. The first time point 911 is a point in time at which a time 913 of $11 \times T_{chip}$ has elapsed from the transmission time point 602 of the transmission signal 620. The third time point 921 is a point in time at which a time 923 of $12 \times T_{chip}$ has elapsed from the transmission time point 602 of the transmission signal 620. The first time point 911 and the second time point 912 are acquired from the system clock of the object distance determining device 400.

When the time 913 from the transmission time point 602 of the transmission signal 620 to the first time point 911 and a time 914 from the reception time point 604 of the reflection signal 630 to the first time point 911 are determined, a time from the transmission time point 602 to the reception time point 604 can be determined. When it is determined that a first code of the first cumulative code sequence 910 corresponds to a ninth code of the default code sequence 610, the reception time point 604 of the reflection signal 630 is earlier than the first time point 911 by the time 914 of $8 \times T_{chip}$. Based on the determined times 913 and 914, the reception time point 604 of the reflection signal 630 is determined to be a point in time at which a time of $(11-8) \times T_{chip} = 3 \times T_{chip}$ has elapsed from the transmission time point 602.

Likewise, when it is determined that a first code of the second cumulative code sequence 920 corresponds to a tenth code of the default code sequence 610, the reception time point 604 of the reflection signal 630 is earlier than the second time point 921 by the time 924 of $9 \times T_{chip}$. Based on the determined times 923 and 924, the reception time point 604 of the reflection signal 630 is determined to be a point in time at which a time of $(12-9) \times T_{chip} = 3 \times T_{chip}$ has elapsed from the transmission time point 602.

A method of determining ordinal positions of codes of the default code sequence 610 corresponding to the first codes of the cumulative code sequences 910 and 920 will be described with reference to FIGS. 10 and 11.

Figure 10:
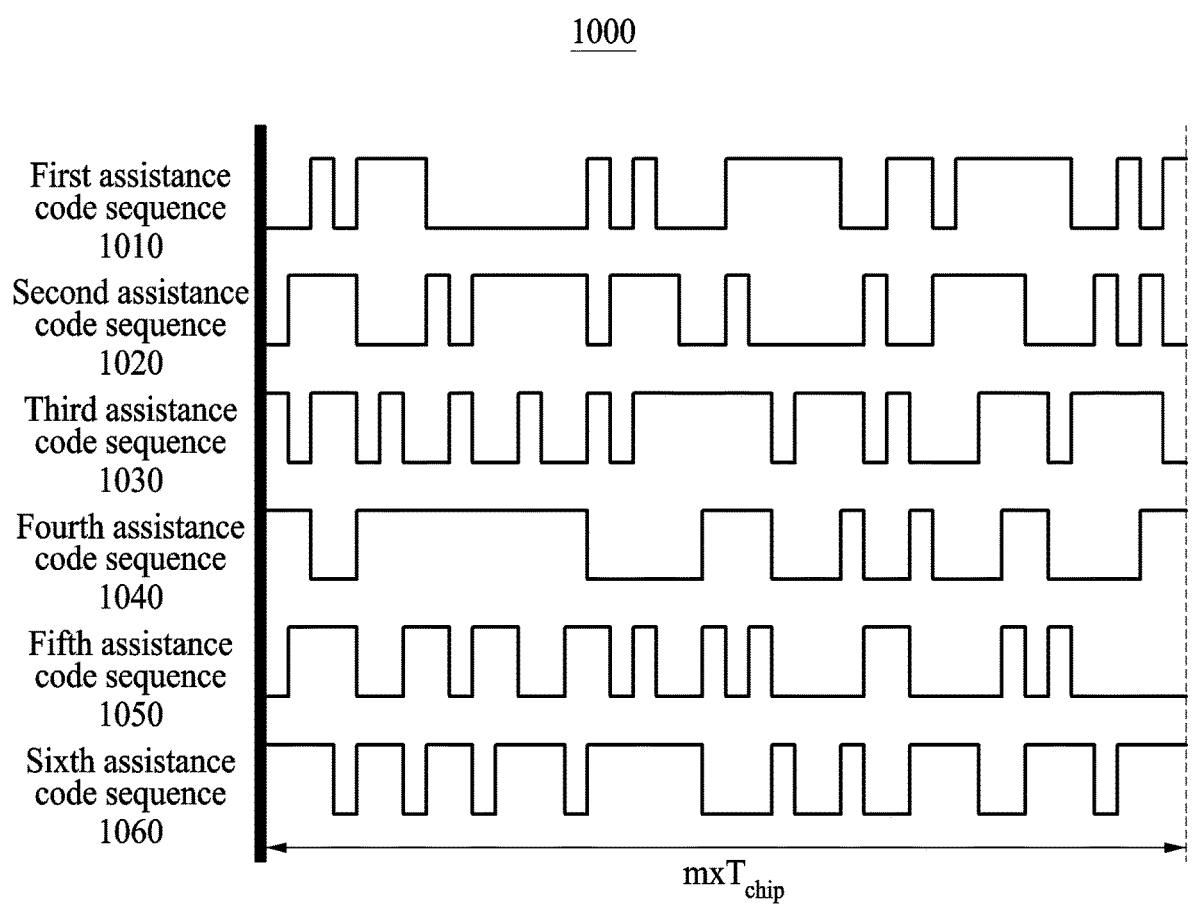
FIG. 10 illustrates an example of an encoding sequence set.

FIG. 10 illustrates an example of an encoding sequence set.

As described with reference to FIG. 3, a correlation is calculated m times in the 1:1 comparison-based method of the cumulative code sequence 800 to the default code sequence 610, and thus an amount of calculations is relatively large. To reduce the amount of calculations, a correlation between the cumulative code sequence 800 and a predetermined assistance code sequence is calculated to obtain a value corresponding to the calculated correlation by referencing a lookup table. The correlation with respect to the cumulative code sequence 800 is calculated based on a single assistance code sequence or calculated based on a plurality of assistance code sequences to increase a reliability of the correlation. An encoding sequence set includes, for example, a single assistance code sequence or a plurality of assistance code sequences.

FIG. 10 illustrates an example of an encoding sequence set 1000 including six assistance code sequences 1010 through 1060. When performing a correlation calculation using a plurality of assistance code sequences, the correlation calculation is performed a number of times equal to a number of the plurality of assistance code sequences (which is six in the example of FIG. 10), and thus an amount of calculations is reduced in comparison to a case in which the calculation is performed m times.

Each of the assistance code sequences 1010 through 1060 included in the encoding sequence set 1000 is a predetermined code sequence having the same length as the default code sequence 610. The assistance code sequences 1010 through 1060 are used to determine a portion of the default code sequence 610 corresponding to the cumulative code sequence 800 as discussed with reference to FIG. 8.

Correlations calculated between the cumulative code sequence 800 and the assistance code sequences 1010 through 1060 are characteristic values with respect to the cumulative code sequence 800. When an arrangement of codes in the cumulative code sequence 800 changes, the correlations between the cumulative code sequence 800 and the assistance code sequences 1010 through 1060 also change. Thus, when the arrangement of the codes in the cumulative code sequence 800 and the correlations between the cumulative code sequence 800 and the assistance code sequences 1010 through 1060 are known, an arrangement of codes corresponding to a correlation calculated with respect to the cumulative code sequence 800 can be determined. This makes it possible to determine which portion of the default code sequence 610 the cumulative code sequence 800 corresponds to, which makes it possible to determine which code of the default code sequence 610 the first code of the cumulative code sequence 800 corresponds to.

Figure 11:
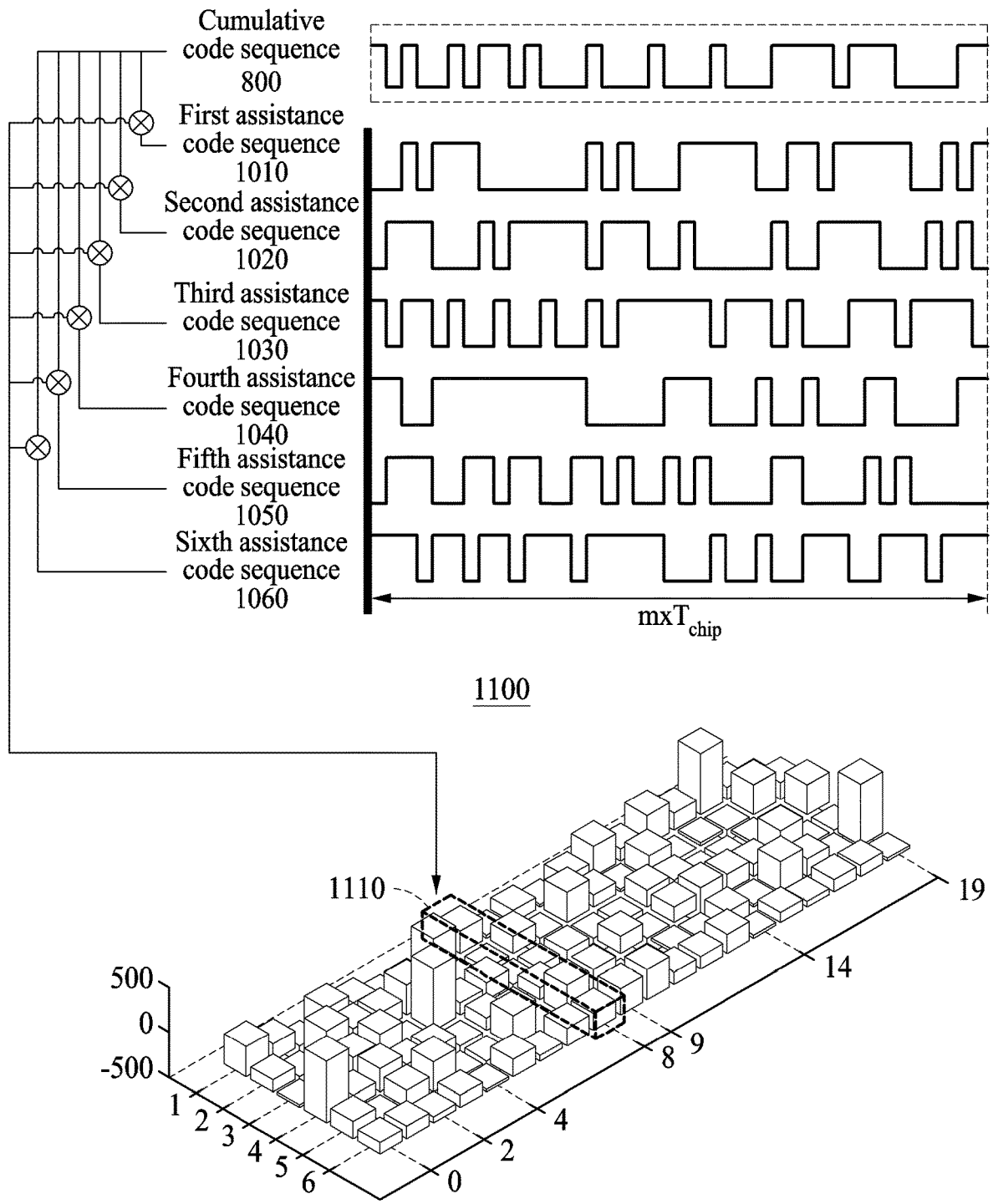
FIG. 11 illustrates an example of a lookup table storing reference correlation vectors and corresponding time indices.

FIG. 11 illustrates an example of a lookup table storing reference correlation vectors and corresponding time indices.

Correlations between the cumulative code sequence 800 and the assistance code sequences 1010 through 1060 included in the encoding sequence set 1000 are calculated. For example, when the encoding sequence set 1000 includes six assistance code sequences, six correlations between the cumulative code sequence 800 and the six assistance code sequences are calculated, and a subject correlation vector including the six correlations is generated. The generated subject correlation vector is a characteristic value with respect to the accumulation time point 810 of the cumulative code sequence 800. The characteristic value is also referred to as a characteristic value representing a distance between an object and a vehicle, or more accurately, between the object and a radar of the vehicle.

FIG. 11 illustrates examples of the six correlations included in the subject correlation vector generated using the six assistance code sequences. When a fewer number of assistance code sequences are used, a number of correlations included in the subject correlation vector is also reduced. For example, when the encoding sequence set 1000 includes a single assistance code sequence, the subject correlation vector includes a single correlation.

The subject correlation vector is compared to reference correlation vectors stored in a lookup table 1100. Reference correlation vectors including correlations between the assistance code sequences included in the encoding sequence set 1000 and the default code sequence 610 are calculated, and values of the reference correlation vectors are stored in the lookup table 1100. For example, a first reference correlation vector with respect to the encoding sequence set 1000 and the default code sequence 610 is previously calculated and a second reference correlation vector between the encoding sequence set 1000 and a default code sequence delayed by a time of $1 \times T_{chip}$ is previously calculated. The delayed default code sequence has the same length as the default code sequence 610, but due to the delay, an arrangement of the codes in the delayed default code sequence is different from an arrangement of the codes in the default code sequence 610 that is not delayed.

For example, a $1 \times T_{chip}$ delayed default code sequence has an arrangement having a code after the time of $1 \times T_{chip}$ from the beginning of the default code sequence 610, i.e., a second code of the default code sequence 610, at the beginning of the $1 \times T_{chip}$ delayed default code sequence, and a first code ($1 \times T_{chip}$) of the default code sequence 610 at the end of $1 \times T_{chip}$ delayed default code sequence.

Also, a $2 \times T_{chip}$ delayed default code sequence has an arrangement having a code after the time of $2 \times T_{chip}$ from the beginning of the default code sequence 610, i.e., the third code of the default code sequence 610, at the beginning of the $2 \times T_{chip}$ delayed default code sequence, and the first code ($1 \times T_{chip}$) and a second code ($2 \times T_{chip}$) of the default code sequence 610 sequentially at the end of the $2 \times T_{chip}$ delayed default code sequence.

Each time the default code sequence 610 is delayed by an additional time of $1 \times T_{chip}$, the first code of the immediately preceding delayed default code sequence is moved to the end of the immediately preceding delayed default code sequence to obtain the new delayed default code sequence.

Accordingly, an $(m-1) \times T_{chip}$ delayed default code sequence has an arrangement having a code after the time of $(m-1) \times T_{chip}$ from the beginning of the default code sequence 610, i.e., the m-th code of the default code sequence 610, at the beginning of the $(m-1) \times T_{chip}$ delayed default code sequence, and the first code ($1 \times T_{chip}$) through the (m-1)-th code (($m-1) \times T_{chip}$) of the default code sequence 610 sequentially at the end of the $(m-1) \times T_{chip}$ delayed default code sequence.

The following Table 1 shows an example of the arrangement of codes in a default code sequence (delay $0 \times T_{chip}$) and m−1 delayed default code sequences for m=6, where the numbers 1 through 6 respectively denote the first through sixth codes of the default code sequence, i.e., the codes in the first through sixth positions in the default code sequence. The actual values of the codes may be "0" or "1," for example.

TABLE 1

| Delay | 1st Code | 2nd Code | 3rd Code | 4th Code | 5th Code | 6th Code |
| --- | --- | --- | --- | --- | --- | --- |
| $0 \times T_{chip}$ | 1 | 2 | 3 | 4 | 5 | 6 |
| $1 \times T_{chip}$ | 2 | 3 | 4 | 5 | 6 | 1 |
| $2 \times T_{chip}$ | 3 | 4 | 5 | 6 | 1 | 2 |
| $3 \times T_{chip}$ | 4 | 5 | 6 | 1 | 2 | 3 |
| $4 \times T_{chip}$ | 5 | 6 | 1 | 2 | 3 | 4 |
| $5 \times T_{chip}$ | 6 | 1 | 2 | 3 | 4 | 5 |

A reference correlation vector between a time-delayed default code sequence and the encoding sequence set 1000 is calculated in advance and stored in the lookup table 1100. When the default code sequence 610 contains m codes, m reference correlation vectors between m default code sequences delayed by times of 0 to $(m-1) \times T_{chip}$ and the encoding sequence set 1000 are calculated in advance and stored in the lookup table 1100.

The plurality of reference correlation vectors stored in the lookup table 1100 have the following meaning. The plurality of reference correlation vectors stored in the lookup table 1100 respectively correspond to a plurality of different reception time points of a reflection signal, and include correlations between the assistance code sequences 1010 through 1060 included in the encoding sequence set 1000 and reflection code sequences corresponding to reflection signals produced by a transmission signal modulated by the default code sequence 610 reflecting from virtual objects located at different distances respectively corresponding to the different reception time points of the reflection signal.

That is, each of the reference correlation vectors corresponds to a particular reception time point of a reflection signal, and includes correlations between the assistance code sequences 1010 through 1060 included in the encoding sequence set 1000 and a reflection code sequence corresponding to a reflection signal produced by a transmission signal modulated by the default code sequence 610 reflecting from a virtual object located at a particular distance corresponding to the particular reception time point of the reflection signal.

The lookup table 1100 includes the plurality of reference correlation vectors and a time index or a distance mapped to each of the reference correlation vectors. A number of the plurality of reference correlation vectors is equal to m, that is, a number of codes in the default code sequence 610. In the example of the lookup table 1100 illustrated in FIG. 11, m=20, so 20 reference correlation vectors are shown in the lookup table 1100 of FIG. 11. Each of the reference correlation vectors is mapped to a distance or a time index (for example, 0 to 19 in the example of the lookup table 1100 illustrated in FIG. 11). However, m is not limited to 20, but may be any number, such as m=256 as discussed above in connection with FIG. 2 and Equation 1.

Correlation values of the subject correlation vector generated using the cumulative code sequence 800 are compared to correlation values of the reference correlation vectors stored in the lookup table 1100. When a target reference correlation vector most similar to the subject correlation vector is determined from the reference correlation vectors stored in the lookup table 1100, a distance or a time index mapped to the target reference correlation vector is used to calculate the reception time point 604 of the reflection signal 630. Hereinafter, an example of calculating the reception time point 604 using a time index will be described.

A target reference correlation vector 1110 most similar to the calculated subject correlation vector is determined from the reference correlation vectors stored in the lookup table 1100. A time index of 8 mapped to the determined target reference correlation vector 1110 in the lookup table 1100 is determined. A value of the time index represents a reception latency between the accumulation time point 810 of the cumulative code sequence 800 and the reception time point 604 of the reflection signal 630. The time index represents a pattern difference between the cumulative code sequence 800 and the default code sequence 610 by a number. The number represents a number of chip durations $T_{chip}$ by which the pattern of the cumulative code sequence 800 is delayed relative to the pattern of the default code sequence 610. Thus, in more general terms, the number represents a delay between the cumulative code sequence 800 and the default code sequence 610. For example, a time index of 8 indicates that the accumulation time point 810 is located a time of $8 \times T_{chip}$ after the reception time point 604 of the reflection signal 630. In addition, a transmission latency between the accumulation time point 810 and the transmission time point 602 of the transmission signal 620 is acquired from the system clock of the object distance determining device 400. Based on the transmission latency and the reception latency, an amount of time from the transmission time point 602 to the reception time point 604 is determined, for example, by subtracting the reception latency from the transmission latency as will be explained in greater detail below.

Figure 12:
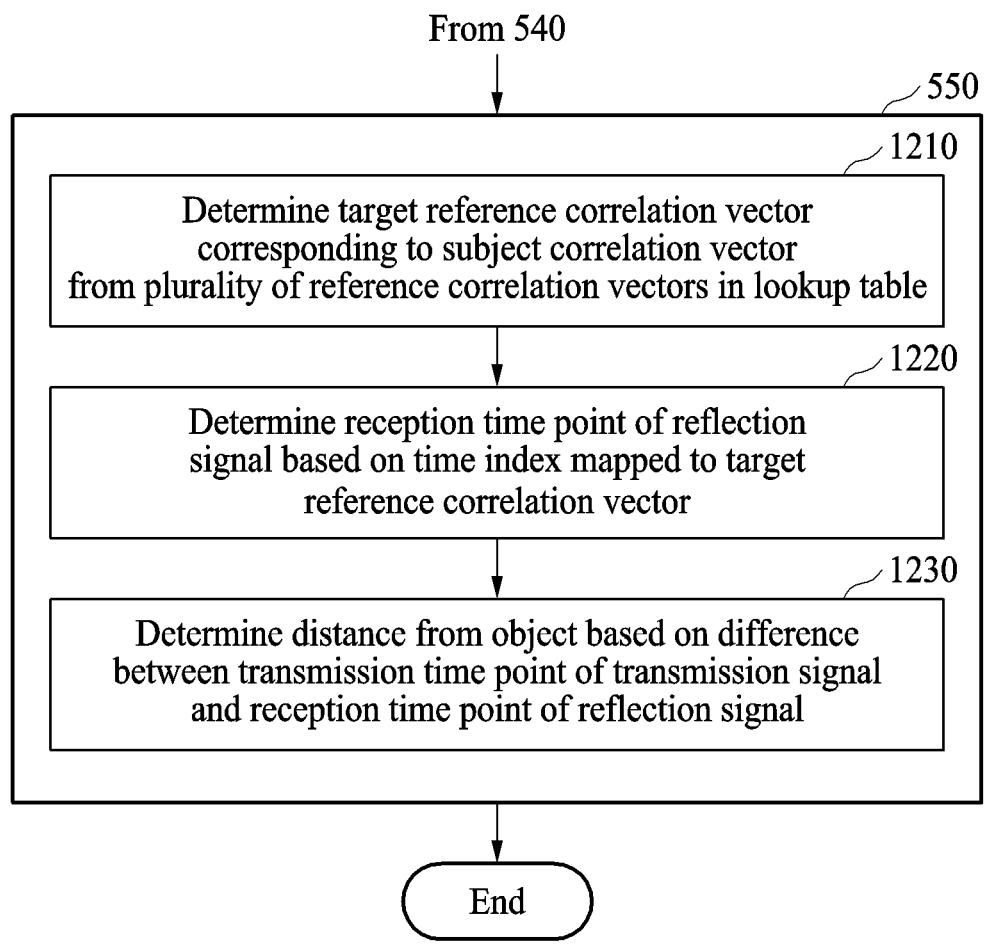
FIG. 12 illustrates an example of a method of determining a distance from an object.

FIG. 12 illustrates an example of a method of determining a distance from an object.

Referring to FIG. 12, operation 550 of FIG. 5 includes operations 1210, 1220, and 1230 described below.

In operation 1210, the object distance determining device 400 determines a target reference correlation vector corresponding to a subject correlation vector from a plurality of reference correlation vectors in the lookup table 1100.

In operation 1220, the object distance determining device 400 determines the reception time point 604 of the reflection signal 630 based on a time index mapped to the target reference correlation vector. For example, the reception time point 604 of the reflection signal 630 is determined based on a point in time indicated by the time index and the accumulation time point 810 of the cumulative code sequence 800 in the reflection code sequence 640 used to generate the subject correlation vector.

In operation 1230, the object distance determining device 400 determines a distance from an object based on a time difference between the transmission time point 602 of the transmission signal 620 and the reception time point 604 of the reflection signal 630.

Even when the distance from the object is the same, the plurality of cumulative code sequences 910 and 920 have different arrangements of codes accumulated at intervals of a time $T_{chip}$. As a result, subject correlation vectors calculated with respect to the plurality of cumulative code sequences 910 and 920 are different from each other. When the subject correlation vectors are different from each other, different time indices are determined. However, because the accumulation time point 810 of the cumulative code sequence 800 is also taken into consideration, the distance from the object is calculated identically regardless of which one of the subject correlation vectors calculated with respect to the plurality of cumulative code sequences 910 and 920 is used to calculate the distance.

In the example of FIG. 9, the first cumulative code sequence 910 is generated by accumulating codes from a point in time after a transmission latency corresponding to a time of $11 \times T_{chip}$ from the transmission time point 602 of the transmission signal 620, and thus an accumulation time point is $11 \times T_{chip}$. Furthermore, the second cumulative code sequence 920 is generated by accumulating codes from a point in time after a transmission latency corresponding to a time of $12 \times T_{chip}$ from the transmission time point 602 of the transmission signal 620, and thus an accumulation time point is $12 \times T_{chip}$.

For example, a first time index indicating a reception latency between the first time point 911 of the first cumulative code sequence 910 or the second time point 921 of the second cumulative code sequence 920 and the reception time point 604 of the reflection signal 630 is taken into consideration simultaneously with a second time index indicating a transmission latency between the first time point 911 of the first cumulative code sequence 910 or the second time point 921 of the second cumulative code sequence 920 and the transmission time point 602 of the transmission signal 620. In this example, even when the first time point 911 is different from the second time point 921, a distance from an object determined based on the first cumulative code sequence 910 is the same as a distance from an object determined based on the second cumulative code sequence 920.

A first time index of the first cumulative code sequence 910 is $8 \times T_{chip}$, and a second time index of the first cumulative code sequence 910 is $11 \times T_{chip}$. A time difference between the transmission time point 602 of the transmission signal 620 and the reception time point 604 of the reflection signal 630 is obtained by subtracting the first time index from the second time index, and is a time of $(11-8) \times T_{chip} = 3 \times T_{chip}$. This corresponds to subtracting the reception latency from the transmission latency. A distance from an object associated with the first cumulative code sequence 910 is calculated according to Equation 2 below.

$$\text{Distance} = \frac{c \times t_{total}}{2} \quad (2)$$

In Equation 2, c denotes the speed of light, and $T_{total}$ denotes a time from the transmission time point 602 to the reception time point 604.

In contrast, a first time index of the second cumulative code sequence 920 is $9 \times T_{chip}$ and a second time index of the second cumulative code sequence 920 is $12 \times T_{chip}$. A time difference between the transmission time point 602 of the transmission signal 620 and the reception time point 604 of the reflection signal 630 is a time of $(12-9) \times T_{chip} = 3 \times T_{chip}$, which is the same as the time difference of $3 \times T_{chip}$ obtained for the first cumulative code sequence 910. Thus, a distance calculated based on the second cumulative code sequence 920 is the same as the distance calculated based on the first cumulative code sequence 910.

Figure 13:
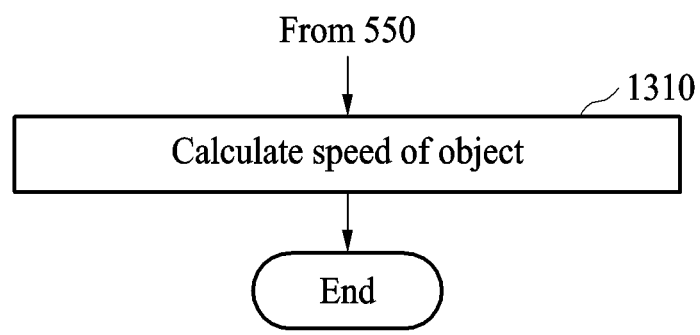
FIG. 13 illustrates an example of a method of calculating a speed of an object.

FIG. 13 illustrates an example of a method of calculating a speed of an object.

Referring to FIG. 13, operation 1310 is performed after operation 550 of FIG. 5.

In operation 1310, the object distance determining device 400 calculates a speed of an object based on a distance from the object determined for each chip duration.

Since operation 550 is performed for each chip duration, the distance from the object is determined for each chip duration. The speed of the object is calculated according to Equation 3 below.

$$\text{Speed of object} = \frac{D_1 - D_2}{t_{chip}} \quad (3)$$

In Equation 3, $D_1$ denotes a distance from an object associated with a first cumulative code sequence, and $D_2$ denotes a distance from an object associated with a second cumulative code sequence.

In terms of a predetermined time point t, $D_2$ is a distance determined at a time at which a t-th code of the reflection code sequence 640 is converted from the reflection signal 630, and $D_1$ is a distance determined at a time at which a (t−1)-th code of the reflection code sequence 640 is converted from the reflection signal 630. Since the distance from the object is determined for each chip duration, the speed of the object is also determined for each chip duration. That is, the distance from the object and the speed of the object are updated after each chip duration.

Figure 14:
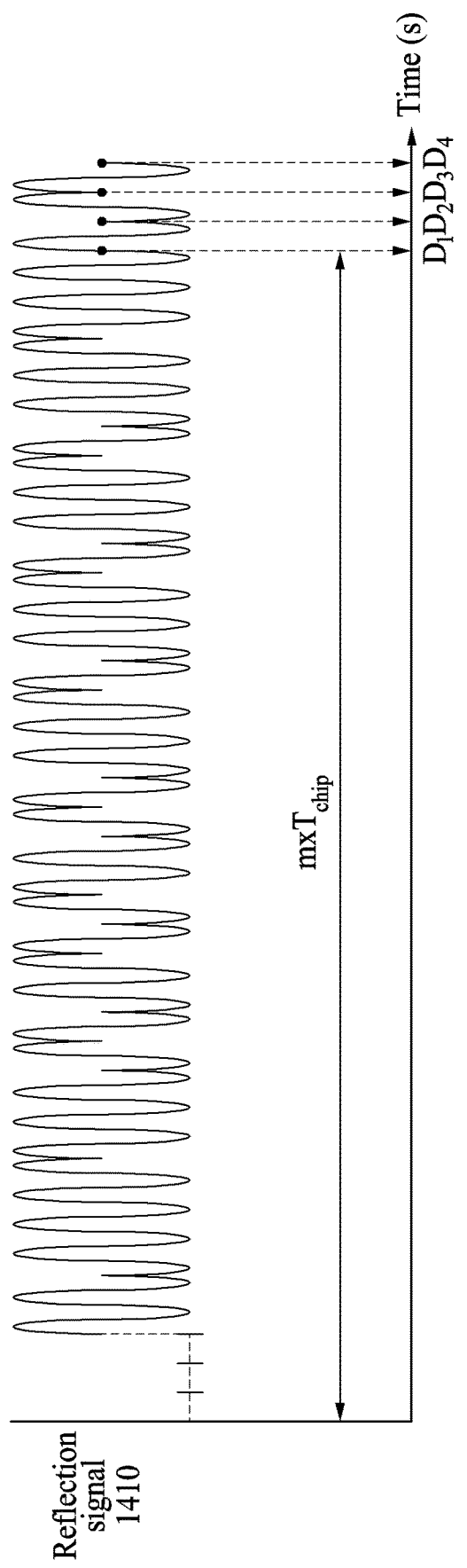
FIG. 14 illustrates an example of times at which a distance between a vehicle and an object is determined.

FIG. 14 illustrates an example of times at which a distance between a vehicle and an object is determined.

FIG. 14 illustrates times at which distances $D_1$, $D_2$, $D_3$, and $D_4$ from an object are determined in response to a reflection signal 1410 being received. An initial distance $D_1$ from the object is determined at a point in time at which a time of m×$T_{chip}$ has elapsed from a transmission time point of the transmission signal, and then a distance from the object is calculated for each chip duration thereafter. Although FIG. 14 illustrates that no reflection signal is received during a time period of 3×$T_{chip}$ at the beginning of the reflection signal 1410, a reflection signal corresponding to a last 3×$T_{chip}$ time period of a reflection signal received in a previous time period of m×$T_{chip}$ is actually received during the time period of 3×$T_{chip}$ in FIG. 14 when a transmission signal is transmitted repetitively.

When the first two distances $D_1$ and $D_2$ from the object have been determined, an initial speed of the object is calculated, and then a speed of the object is calculated for each chip duration thereafter.

The object determining distance device 400, the communicator 410, the processor 420, and the member 430 in FIG. 4 that perform the operations described in this application with respect to FIGS. 1 through 14 are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, radios, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 5, 7, 12, and 13 that perform the operations described in this application with respect to FIGS. 1 through 14 are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of determining a distance from an object performed in an apparatus comprising a radar, the method comprising:
    receiving a reflection signal produced by a transmission signal reflecting from the object, the transmission signal being modulated by a default code sequence;
    converting the reflection signal into a reflection code sequence;
    generating a subject correlation vector comprising at least one correlation between at least one assistance code sequence and the reflection code sequence; and
    determining a distance corresponding to the subject correlation vector by referencing a lookup table storing at least one reference correlation vector comprising at least one correlation between the at least one assistance code sequence and the default code sequence,
    wherein the converting of the reflection signal into the reflection code sequence comprises generating a cumulative code sequence comprising a preset number of codes by accumulating a portion of the reflection code sequence, and
    wherein the generating of the cumulative code sequence comprises loading the cumulative code sequence from a target accumulator configured to store the preset number of codes among a plurality of accumulators having different accumulation time points.

2. The method of claim 1, wherein the transmission signal is a phase-modulated continuous waveform (PMCW) signal.

3. The method of claim 1, wherein the preset number of codes included in the cumulative code sequence is equal to a number of codes included in the default code sequence.

4. The method of claim 1, wherein the cumulative code sequence comprises a latest code in the reflection code sequence.

5. The method of claim 1, wherein the generating of the cumulative code sequence comprises loading the cumulative code sequence from a queue configured to store the preset number of codes on a first-in, first-out basis.

6. The method of claim 1, wherein the lookup table stores a plurality of reference correlation vectors and a plurality of time indices respectively mapped to the plurality of reference correlation vectors, and
    the determining of the distance corresponding to the subject correlation vector comprises:
        determining a target reference correlation vector corresponding to the subject correlation vector from the plurality of reference correlation vectors in the lookup table;
        determining a reception time point of the reflection signal based on the time index mapped to the target reference correlation vector; and
        determining the distance from the object based on a time difference between a transmission time point of the transmission signal and the reception time point of the reflection signal.

7. The method of claim 6, wherein the converting of the reflection signal into the reflection code sequence comprises generating a cumulative code sequence comprising a preset number of codes by accumulating a portion of the reflection code sequence,
    the at least one correlation of the subject correlation vector comprises at least one correlation between the at least one assistance code sequence and the cumulative code sequence, and
    the determining of the reception time point of the reflection signal comprises determining the reception time point based on a point in time indicated by the time index mapped to the target reference correlation vector and an accumulation time point of the cumulative code sequence.

8. The method of claim 7, wherein the time index represents a pattern difference between the cumulative code sequence and the default code sequence by a number.

9. The method of claim 7, wherein the accumulation time point of the cumulative code sequence is acquired from a system clock of the apparatus comprising the radar.

10. The method of claim 1, further comprising calculating a speed of the object based on the determined distance corresponding to the subject correlation vector and a previously determined distance corresponding to a previous subject correlation vector,
    wherein the reflection code sequence comprises t codes, t being greater than a number of codes in the default code sequence,
    the determined distance is a distance determined at a point in time at which a t-th code of the reflection code sequence is converted from the reflection signal, and
    the previously determined distance is a distance determined at a point in time at which a (t−1)-th code of the reflection code sequence is converted from the reflection signal.

11. The method of claim 1, wherein the radar is included in a vehicle.

12. The method of claim 11, wherein the vehicle is an autonomous vehicle.

13. The method of claim 1, wherein a number of the at least one assistance code sequence is greater than or equal to two.

14. The method of claim 1, wherein a number of the at least one assistance code sequence is equal to one.

15. The method of claim 1, wherein the lookup table stores a plurality of reference correlation vectors respectively corresponding to a plurality of different reception time points of a reflection signal, and comprising at least one correlation between the at least one assistance code sequence and reflection code sequences corresponding to reflection signals produced by the transmission signal modulated by the default code sequence reflecting from reference objects located at different distances respectively corresponding to the different reception time points of the reflection signal.

16. A non-transitory computer-readable medium storing instructions that, when executed by a processor, cause the processor to perform the method of claim 1.

17. A device for determining a distance from an object in an apparatus comprising a radar, the device comprising:
a processor; and
a memory configured to store at least one instruction that is executable by the processor;
wherein the processor executing the at least one instruction configures the processor to:
receive data representing a reflection signal produced by a transmission signal reflecting from the object, the transmission signal being modulated by a default code sequence;
convert the reflection signal into a reflection code sequence;
generate a subject correlation vector comprising at least one correlation between at least one assistance code sequence and the reflection code sequence; and
determine a distance corresponding to the subject correlation vector by referencing a lookup table storing at least one reference correlation vector comprising at least one correlation between the at least one assistance code sequence and the default code sequence,
wherein, for the converting of the reflection signal into the reflection code sequence, the processor is configured to generate a cumulative code sequence comprising a preset number of codes by accumulating a portion of the reflection code sequence, and
wherein, for the generating of the cumulative code sequence, the processor is configured to load the cumulative code sequence from a target accumulator configured to store the preset number of codes among a plurality of accumulators having different accumulation time points.

18. The device of claim 17, wherein the processor executing the at least one instruction further configures the processor to generate a cumulative code sequence comprising a preset number of codes by accumulating a portion of the reflection code sequence.

19. The device of claim 17, wherein the lookup table stores a plurality of reference correlation vectors and a plurality of time indices respectively mapped to the plurality of reference correlation vectors, and
the processor executing the at least one instruction further configures the processor to:
determine a target reference correlation vector corresponding to the subject correlation vector from the plurality of reference correlation vectors in the lookup table;
determine a reception time point of the reflection signal based on the time index mapped to the target reference correlation vector; and
determine the distance from the object based on a time difference between a transmission time point of the transmission signal and the reception time point of the reflection signal.

20. The device of claim 17, wherein a number of the at least one assistance code sequence is greater than or equal to two.

21. The device of claim 17, wherein a number of the at least one assistance code sequence is equal to one.

22. The device of claim 17, wherein the lookup table stores a plurality of reference correlation vectors respectively corresponding to a plurality of different reception time points of a reflection signal, and comprising at least one correlation between the at least one assistance code sequence and reflection code sequences corresponding to reflection signals produced by the transmission signal modulated by the default code sequence reflecting from reference objects located at different distances respectively corresponding to the different reception time points of the reflection signal.

23. A method of determining a distance from an object performed in an apparatus comprising a radar, the method comprising:
receiving a reflection signal produced by a transmitting signal reflecting from the object, the transmitting signal being modulated by a default code sequence;
converting the reflection signal into a reflection code sequence; and
determining the distance from the object based on a comparison between a first value determined based on an assistance code sequence and the reflection code sequence, and a plurality of second values already determined before the reflection signal was received based on the assistance code sequence and the default code sequence,
wherein the converting of the reflection signal into the reflection code sequence comprises generating a cumulative code sequence comprising a preset number of codes by accumulating a portion of the reflection code sequence, and
wherein the generating of the cumulative code sequence comprises loading the cumulative code sequence from a target accumulator configured to store the preset number of codes among a plurality of accumulators having different accumulation time points.

24. The method of claim 23, wherein the first value is a value of a correlation between the assistance code sequence and a portion of the reflection code sequence, and
each of the second values is a correlation between the assistance code sequence and a delayed default code sequence obtained by delaying the default code sequence by a different amount for each of the second values.

25. The method of claim 24, wherein the default code sequence and the portion of the reflection code sequence each have a length of m codes, and
the second values are m second values determined based on m delayed default code sequences obtained by delaying the default code sequence by amounts corresponding to 0 to m−1 codes.

26. The method of claim 25, wherein a first delayed default code sequence of the m delayed default code sequences is the default code sequence, and
each succeeding one of the m delayed default code sequences is obtained by moving a first code of an immediately preceding one of the m delayed default code sequences to an end of the immediately preceding one of the m delayed default code sequences.

27. The method of claim 23, wherein the second values and a plurality of time indices respectively mapped to the second values are stored in a lookup table, and
the determining of the distance from the object comprises:
retrieving from the lookup table the time index mapped to one of the second values that is most similar to the first value; and
determining the distance from the object based on the retrieved time index.

28. The method of claim 27, wherein the first value is determined based on the assistance code sequence and a portion of the reflection code sequence, each of the second values is determined based on the assistance code sequence and a delayed default code sequence obtained by delaying the default code sequence by a different amount for each of the second values, each of the time indices represents an amount of time by which the default code sequence was delayed to obtain the delayed default code sequence used in determining a corresponding one of the second values, the retrieved time index represents a reception latency between a reception time point of the reception signal and a reception time point of a beginning of the portion of the reflection code sequence used in determining the first value, and the determining of the distance from the object based on the retrieved time index comprises:
- determining a time difference between the reception latency and a transmission latency between a transmission time of the transmission signal and the reception time point of the beginning of the reflection code sequence; and
- determining the distance from the object based on the time difference.

\* \* \* \* \*